(12) United States Patent
Gelmetti

(10) Patent No.: US 10,783,207 B2
(45) Date of Patent: Sep. 22, 2020

(54) METHOD FOR RETRIEVING INFORMATION ABOUT A WELDING WIRE, COMPUTER-IMPLEMENTED METHOD FOR RETRIEVING INFORMATION ABOUT A WELDING WIRE AND SYSTEM FOR RETRIEVING INFORMATION ABOUT A WELDING WIRE

(71) Applicant: SIDERGAS SPA, S. Ambrogio di Valpolicella (IT)

(72) Inventor: Carlo Gelmetti, Lazise (IT)

(73) Assignee: SIDERGAS SPA, S. Ambrogio di (IT)

( * ) Notice: Subject to any disclaimer, the term of this patent is extended or adjusted under 35 U.S.C. 154(b) by 305 days.

(21) Appl. No.: 15/361,155

(22) Filed: Nov. 25, 2016

(65) Prior Publication Data

US 2018/0150567 A1 May 31, 2018

(51) Int. Cl.
*G06F 16/955* (2019.01)
*G06Q 30/00* (2012.01)
*G06Q 30/02* (2012.01)
*G06Q 10/08* (2012.01)
*G06Q 10/10* (2012.01)
*G06Q 50/04* (2012.01)
*G06K 7/10* (2006.01)
(Continued)

(52) U.S. Cl.
CPC ..... *G06F 16/9554* (2019.01); *G06K 7/10722* (2013.01); *G06K 7/1417* (2013.01); *G06Q 10/087* (2013.01); *G06Q 10/10* (2013.01); *G06Q 30/018* (2013.01); *G06Q 30/0281* (2013.01); *G06Q 50/04* (2013.01); *H04L 67/1097* (2013.01)

(58) Field of Classification Search
CPC .......... G06F 17/30879; G06F 16/9554; G06Q 50/04; G06Q 30/0281; G06Q 30/018; G06Q 10/10; G06Q 10/087; G06K 7/1417; G06K 7/10722; H04L 67/1097; B23K 9/173; B23K 35/0261
See application file for complete search history.

(56) References Cited

U.S. PATENT DOCUMENTS 6,267,291 B1 * 7/2001 Blankenship ........ B23K 9/1062
235/375
2004/0004113 A1 * 1/2004 Blankenship ........ B23K 9/1062
235/375
(Continued)

FOREIGN PATENT DOCUMENTS

EP 1065620 1/2001 ............... G06K 1/12
EP 2927854 10/2015 ............. G06Q 10/10
(Continued)

*Primary Examiner* — Robert W Beausoliel, Jr.
*Assistant Examiner* — Mohammad Solaiman Bhuyan
(74) *Attorney, Agent, or Firm* — Hayes Soloway P.C.

(57) ABSTRACT

A method for retrieving information about a welding wire used by a welding machine is described. A welding wire is provided that has a code. A mobile device is provided that has internet access. Said code is entered by using said mobile device. Information about said welding wire is retrieved from a server based upon said code. Said information retrieved is provided to the user. Further, a computer-implemented method as well as a system for retrieving information about a welding wire used by a welding machine are described.

21 Claims, 3 Drawing Sheets

(51) Int. Cl.
*G06K 7/14* (2006.01)
*H04L 29/08* (2006.01)

(56) References Cited

U.S. PATENT DOCUMENTS

| | | | | |
|---|---|---|---|---|
| 2005/0279819 | A1* | 12/2005 | Stava | B23K 9/1062 |
| | | | | 235/375 |
| 2015/0142144 | A1* | 5/2015 | Damir | G06F 16/9554 |
| | | | | 700/94 |
| 2016/0260053 | A1* | 9/2016 | Barron | G06Q 10/08 |
| 2016/0267806 | A1* | 9/2016 | Hsu | G09B 19/24 |
| 2016/0342917 | A1* | 11/2016 | Surapaneni | G06Q 10/06315 |
| 2017/0036288 | A1* | 2/2017 | Albrecht | B23K 9/0953 |

FOREIGN PATENT DOCUMENTS

| | | | | |
|---|---|---|---|---|
| JP | 2008059116 | 3/2008 | ........... | G05B 19/418 |
| WO | WO2016033568 | 3/2016 | ............ | B23K 9/095 |
| WO | WO2016140789 | 9/2016 | ............ | G06Q 10/08 |

* cited by examiner

METHOD FOR RETRIEVING INFORMATION ABOUT A WELDING WIRE, COMPUTER-IMPLEMENTED METHOD FOR RETRIEVING INFORMATION ABOUT A WELDING WIRE AND SYSTEM FOR RETRIEVING INFORMATION ABOUT A WELDING WIRE

TECHNICAL FIELD

The invention relates to a method, a computer-implemented method as well as a system for retrieving information about a welding wire used by a welding machine.

BACKGROUND OF THE INVENTION

In different industry fields, welding wires are commonly used for joining metal parts. In order to achieve desired mechanical properties like a certain tensile strength, yield strength and/or impact strength, a welding process must often be carried out in conformance with preset welding procedures. These welding procedures are specified by industry norms, for instance.

Prior to a mass implementation of a dedicated welding process using a certain welding wire, qualification processes have to be carried out under the supervision of qualified inspectors in order to verify that the welding wire fulfills the required quality standards such as the mechanical properties mentioned above. For the qualification processes, the qualified inspectors require information regarding the welding wire used like the chemical analyses, welding parameters as recommended by the manufacturer and even important safety procedures for the correct and safe use of the welding wire and other supportive documents. Since these documents may comprise private and/or confidential information, these documents are usually not distributed on the internet.

However, during the qualification processes such documents need to be accessed by the qualified inspectors before the welding process is initiated. As the testing site may be located in a different time zone with respect to the manufacturer or the distributor, the business operating hours of the manufacturer or the distributor may not comply with the time at the testing site.

The object of the invention is to provide an opportunity ensuring that at least a limited access to such documents is possible under those circumstances mentioned above.

SUMMARY OF THE INVENTION

The invention provides a method for retrieving information about a welding wire used by a welding machine, with the following steps:
providing a welding wire having a code,
providing a mobile device having internet access,
entering said code by using said mobile device,
retrieving information about said welding wire from a server based upon said code, and
providing said information retrieved to the user.

Further, the invention provides a computer-implemented method for retrieving information about a welding wire used by a welding machine, data related to a code of said welding wire being generated by a mobile device having internet access based upon said code of said welding wire, said data generated being processed by said mobile device such that information about said welding wire is inquired and provided to said mobile device.

The invention further provides a system for retrieving information about a welding wire used by a welding machine, comprising a welding wire with a code and a mobile device that is configured to process said code in order to retrieve information about said welding wire.

The invention is based on the finding that information about the welding wire can be accessed by the user every time and everywhere since the relevant information is provided on the internet wherein the access to the information is limited such that the information is not freely available for everyone. Since the user enters the code of the welding wire by using his mobile device, it is ensured that the user is allowed to retrieve such information. Accordingly, the code grants access to the relevant information related to the welding wire wherein this information might be private or confidential. Entering the code means that the code can be entered automatically and/or manually by using said mobile device. Since the mobile device is used for entering the code, the code is processed by the mobile device such that a request is generated for inquiring the information needed. In a certain embodiment, the mobile device processes the code by just forwarding the code entered to the server which provides the information related to the code being processed.

The code may be a machine-readable code which might be an optical and/or an electromagnetic representation of data. Thus, the information related to the code cannot be readout by a human without using a machine.

According to an aspect, said code is entered by the user manually. The code may comprise characters and/or numbers which are typed in by the user manually using the mobile device. Hence, the mobile device has a certain input interface, for instance a touch-sensitive display being used as an input panel.

According to another aspect, said code is scanned with said mobile device. The scanned code is entered automatically which simplifies the process of entering said code as mistakes of the user can be prevented while entering the code manually. Moreover, the process of entering the code is accelerated with respect to entering the code manually. The mobile device may have a camera which is used as a scanning unit.

Said information retrieved may be stored on said server, said information retrieved being downloaded from said server. Thus, it is ensured that the user of the welding wire can retrieve the information every time and everywhere since the mobile device communicates with a server that might be located anywhere. Accordingly, there is no restriction regarding time zones with respect to the testing site and the location of the manufacturer or distributor of the welding wire.

Particularly, said server is a cloud server. Different persons have access to the cloud server for uploading their data related to welding wires, for instance. Accordingly, manufacturer and/or distributors of welding wires may have access to the cloud server.

According to an embodiment, said information retrieved is displayed on said mobile device. The information retrieved is easily accessible for the user as it is displayed directly on the mobile device having a display. Hence, the mobile device is used for entering the code and displaying the information retrieved after entering the code.

Therefore, the mobile device comprises a scanning unit for automatically entering the code and a displaying unit for providing the information retrieved to the user. The scanning and displaying units may be provided by the camera and the display of the mobile device, respectively.

Particularly, said mobile device is a smart phone or a tablet computer. A smart phone and a tablet computer each typically comprise an integrated camera that can be used for scanning the code. Further, the smart phone or the tablet computer may have a processing unit wherein the smart phone or the tablet computer can be configured to run an application which provides a graphical user interface for entering said code. Moreover, the user may select if the code shall be scanned (entered automatically) or entered manually via the graphical user interface.

Further, said information may be printed and/or sent to the user, in particular wherein said information is sent via e-mail. The mobile device can be connected with a printer via a wireless connection or a cable connection such that the information retrieved can be printed. The user may choose whether the information retrieved is sent via e-mail to him or another third person. The user may have restricted rights which define if the user is allowed to forward or send the information retrieved via e-mail in order to restrict the distribution of the information retrieved.

Particularly, said code is provided by a coded welding wire and/or by a code printed on a drum of said welding wire, printed on a spool of said welding wire printed on a tag attached to said welding wire and/or printed on a packaging of said welding wire. A coded welding wire comprises a code that is integrated in the welding wire. Thus, the user just scans the welding wire in order to enter the code. Alternatively, the code is printed on an item related to the welding wire such as a tag, a packaging, a spool or a drum of the welding wire.

Said code may be a linear code, a 2D code, and/or a radio frequency code, in particular a bar code and/or a QR code. Thus, it is ensured that the code can be entered automatically, in particular scanned, in a very fast manner.

According to an embodiment, said information comprises at least one document related to the purchase of said welding wire, its quality, its specification and/or its usage. These different documents may be of interest for the user when starting the welding process, in particular for a qualified inspector supervising a qualification process.

Particularly, said document is a manual, a purchase order form, a packing list, a transport document, a proof of delivery, a commercial information, a certificate of origin, a quality certificate, an approval certificate, a chemical analysis certificate, a certificate of conformance, a declaration of performance, a safety data sheet, and/or a procedure specification. These different documents can be retrieved by the user when entering the code of the welding wire as these documents are related to the certain type of welding wire being specified by the code. In general, the different documents may be of interest for the user before starting the welding process.

According to an aspect, the user can select said information to be retrieved manually, in particular at least one document. The user may select which kind of information is of importance for him such that only at least one document related to the information being of interest is retrieved, in particular downloaded. Hence, only the required information is transmitted which saves costs and time.

Furthermore, said mobile device may be configured such that said information retrieved can be saved and/or distributed. The user does not need to download the information several times as he can save the documents (information) on his mobile device. It can be suitable that the user is allowed to distribute said information retrieved to colleagues. However, restriction requirements can be implemented in order to limit the rights of the user, in particular the right of distributing said information retrieved as the information may be private and/or confidential.

In addition, said information may be provided with restriction requirements limiting the access to said information. Depending on the user, certain information is not accessible for the user such that only a certain kind of information can be inquired by the user. Thus, the mobile device processing the code may also provide a certain identification (ID) which is verified by the server on which the information is stored. Depending on the ID corresponding to the user, only certain documents are available for the user.

For inquiring information about said welding wire, the mobile device has to generate data which are generated by scanning or manually entering said code of said welding wire. This data can be a conversion of the code and a further processing of the code, respectively. Alternatively, the data generated just corresponds to the code that is forwarded from the mobile device to the server that interprets (further processes) the code.

According to an aspect, said mobile device comprises a processing unit that is configured to run an application, said processing unit being further configured to perform said computer-implemented method as described above.

Moreover, said system may be configured to perform said method as mentioned above.

Hence, the system is configured to perform the methods described above.

BRIEF DESCRIPTION OF DRAWINGS

The invention will now be described with reference to an exemplary embodiment which is shown in the enclosed drawings. In the drawings.

DETAILED DESCRIPTION OF EXAMPLE EMBODIMENTS

Figure 1:
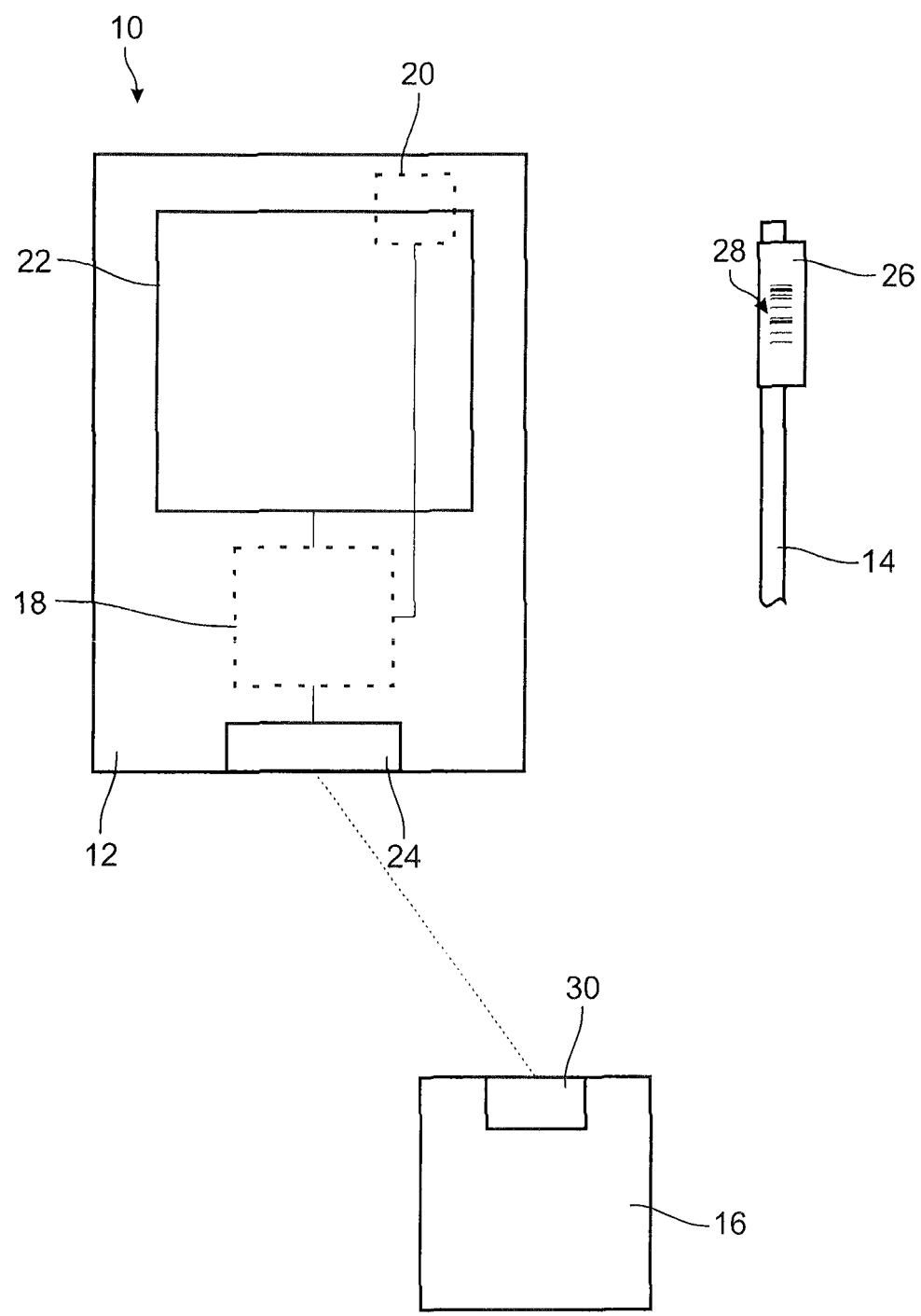
FIG. 1 schematically shows a system according to the invention.

In FIG. 1, a system 10 is shown which comprises a mobile device 12, a welding wire 14 and a server 16. The system 10 is used to retrieve information about the welding wire 14 that can be used by a welding machine, for instance for qualification purposes and/or in the course of production.

In the shown embodiment, the mobile device 12 is a smart phone that comprises a processing unit 18 which is encompassed in a housing of the mobile device 12. The processing unit 18 is connected to a camera 20 and a display 22 of the mobile device 12. For instance, the camera 20 is provided on the backside of the mobile device 12 whereas the display 22 is arranged on the front side of the mobile device 12. Moreover, the mobile device 12 has a communication interface 24 ensuring Internet access as will be described later.

Further, the welding wire 14 comprises a tag 26 with a code 28 in the form of a barcode being a linear code. The code 28 can be scanned by the mobile device 12 using its camera 20 in order to retrieve information about the welding wire 14. Thus, the code 28 is automatically entered by using the mobile device 12 while scanning the code 28.

Since the mobile device 12 has internet access via its communication interface 24, the code 28 entered can be used in order to retrieve information about the welding wire 14 wherein this information is stored on the server 16 that also has a communication interface 30 providing internet access. Thus, the information about the welding wire 14 stored on the server 16 can be retrieved from the server 16 via the internet. Then, the information can be provided to the user by displaying the information retrieved on the display 22 of the mobile device 12.

In general, the server 16 may be a cloud server which can be used by different companies, in particular manufacturers and/or distributors, in order to upload information regarding certain welding wires. Accordingly, information of different welding wires can be accessed by using the mobile device 12 as long as the welding wires have a machine-readable code.

In an alternative embodiment, the user can use a tablet computer as mobile device 12 instead of the smart phone as shown in FIG. 1. The tablet computer may also have a camera, a display and a processing unit such that the tablet computer is formed substantially similar with respect to the smart phone.

Furthermore, the user may decide if the information retrieved is downloaded on the mobile device 12, printed and/or sent to the user or another third person, in particular wherein said information may be sent via e-mail.

As already mentioned, the code 28 is a linear code. However, a two dimensional code such as a QR code and/or a radio frequency code may be used instead of or in addition to this linear code.

In the shown embodiment, the code 28 is printed on a tag 26 that is attached to the welding wire 14 for an unambiguous assignment as shown in FIG. 1. Alternatively or additionally, a drum of said welding wire 14, a spool of said welding wire 14 and/or a packaging of said welding wire 14 may comprise the code 28. Further, the code 28 can be integrated in the welding wire 14 such that the welding wire 14 is a coded welding wire.

The information retrieved from the server 16 may comprise at least one document related to the purchase of the welding wire 14, its quality, its specification and/or its usage. Thus, the at least one document retrieved may be a manual, a purchase order form, a packing list, a transport document, a proof of delivery, a commercial information, a certificate of origin, a quality certificate, an approval certificate, a chemical analysis certificate, a certificate of conformance, a declaration of performance, a safety data sheet, and/or a procedure specification.

Accordingly, all relevant information regarding the welding wire 14 can be stored on the (cloud) server 16 such that this information, in particular the related documents, can be accessed easily by using the mobile device 12. As already mentioned, the code 28 of the welding wire 14 may be scanned for inquiring the information required.

In general, the information is retrieved by entering the code 28 while using the mobile device 12. This code 28 can be scanned as shown in FIG. 1 since the code is a machine-readable barcode. Alternatively, the code 28 can be entered manually by the user while typing in characters and numbers, for instance.

Accordingly, the code 28 can be entered automatically (scanning) or manually (typing).

When the code 28 is entered, the processing unit 18 of the mobile device 12 processes the code 28 such that an inquiry on the server 16 is generated such that the information inquired is provided to the mobile device 12 based upon the code 28 entered. The processing of the code 28 may be a step wherein the code 28 entered or data related to that code 28 is just forwarded to the server 16.

The mobile device 12, in particular the processing unit 18, is configured such that an application can run on the mobile device 12 wherein the mobile device 12 is configured to perform a computer-implemented method for retrieving such information. Particularly, the processing unit 18 may generate a graphical user interface which is used to control a method for retrieving information about the welding wire 14.

Thus, the mobile device 12 generates data related to the code 28 of said welding wire 14 based upon the code 28 entered manually or automatically. The generated data is processed by the mobile device 12 such that information about the welding wire 14 is inquired and provided to the mobile device 12, for instance downloaded. The data may be processed by just forwarding the code 28 as entered to the server 16 which further processes the code 28 in order to provide the information related to the code 28.

Accordingly, the mobile device 12 communicates with the server 16 via their communication interfaces 24, 30 by forwarding data related to the code 28 entered wherein the data may comprise an inquiry which is processed by the server 16 such that information related to the code 28 entered is provided. For instance, the information related to the code 28 is sent via an e-mail to the user, downloaded on the mobile device 12 or the information is just made accessible for the mobile device 12.

Particularly, the application running on the mobile device 12 may only have access to the database of the server 16 wherein the information still remains on the server 16. Accordingly, the application only provides web access.

In FIGS. 2 to 9, the application running on the mobile device 12 representing the (computer-implemented) method is shown, in particular the different states of the graphical user interface.

Figures 2, 3:
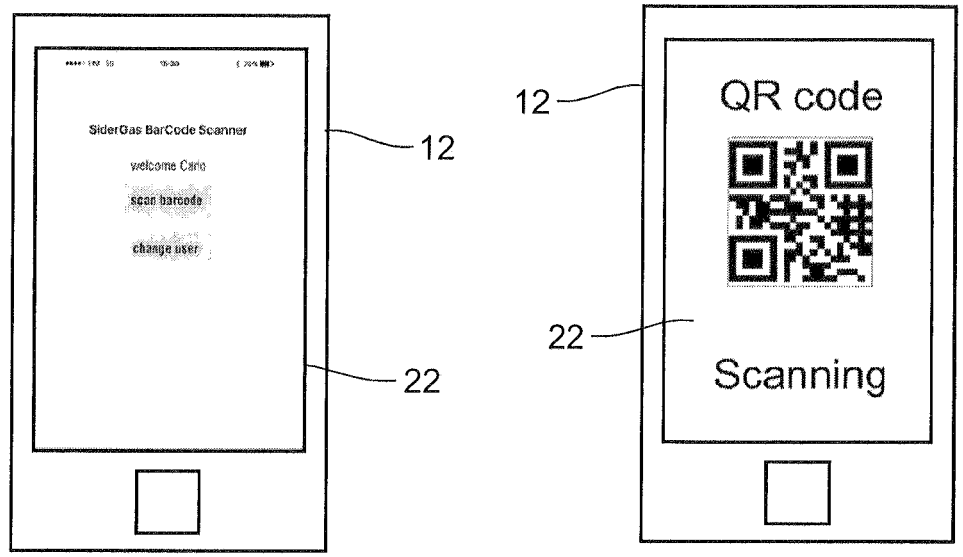
FIG. 2 shows an exemplary graphical user interface of an application running on said mobile device in a first state.
FIG. 3 shows an exemplary graphical user interface of an application running on said mobile device in a second state.

In a first stage shown in FIG. 2, the user may select if the code 28 shall be entered automatically (scanned by using the camera 20 of the mobile device 12) or if the code 28 shall be entered manually. Usually, the selection depends on the type of code 28 provided. Further, the user may change the user such that an identification (ID) related to the user is also changed which is transmitted with the inquiry.

Accordingly, three different areas may be displayed on the display 22 of the mobile device 12 even though in FIG. 2 only two areas are shown, in particular one area for entering the code 28 automatically and another area for changing the user.

In FIG. 3, a second stage is shown wherein the user has decided to automatically scan the code 28 which has been identified as a QR code by the mobile device 12 automatically. Alternatively, the user can select which type of code is provided. During the scanning process, the mobile device 12, in particular the processing unit 18, generates data which are sent or forwarded to the serer 16 in order to retrieve information about the welding wire 14 having the code 28 which has been entered.

Figures 4, 5:
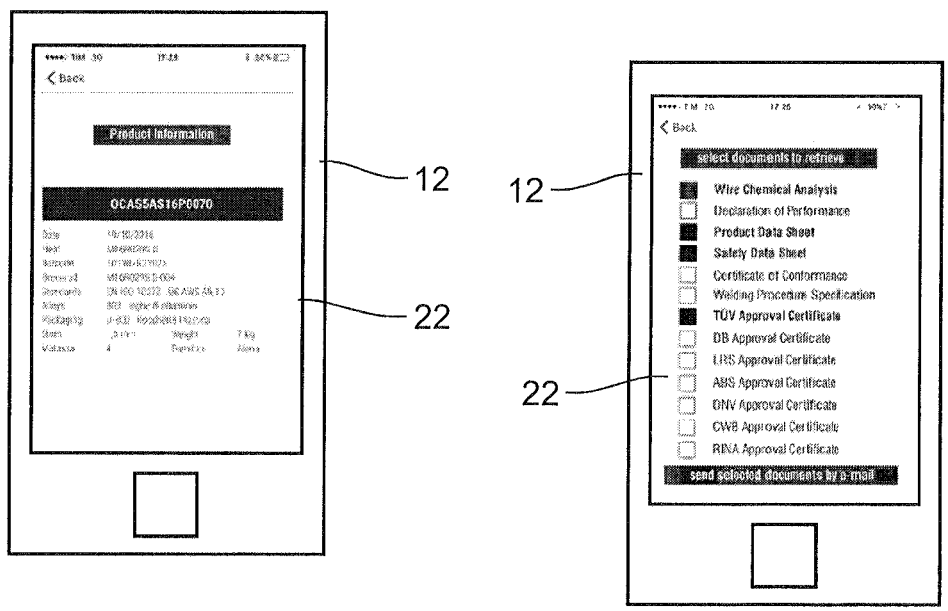
FIG. 4 shows an exemplary graphical user interface of an application running on said mobile device in a third state.
FIG. 5 shows an exemplary graphical user interface of an application running on said mobile device in a fourth state.
Figure 6:
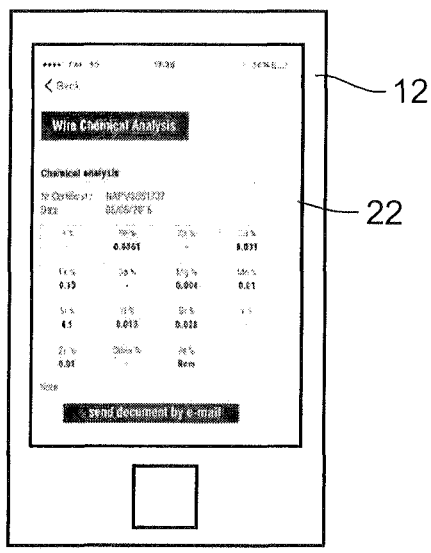
FIG. 6 shows an exemplary graphical user interface of an application running on said mobile device in a fifth state.
Figure 7:
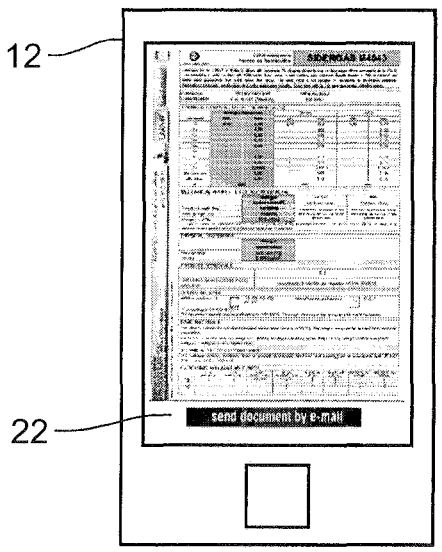
FIG. 7 shows an exemplary graphical user interface of an application running on said mobile device in a sixth state.
Figure 8:
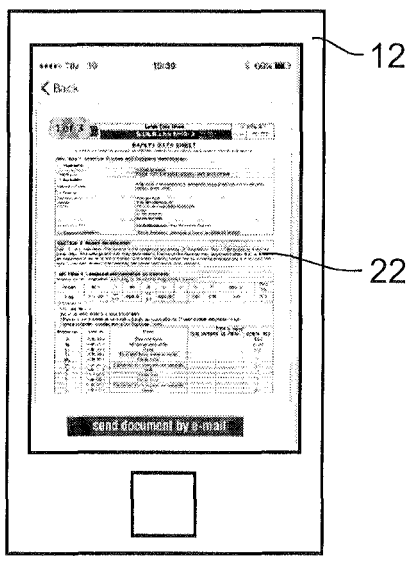
FIG. 8 shows an exemplary graphical user interface of an application running on said mobile device in a seventh state.
Figure 9:
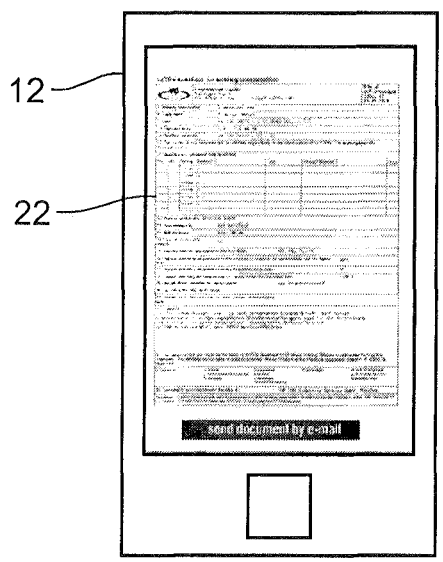
FIG. 9 shows an exemplary graphical user interface of an application running on said mobile device in an eighth state.

After the data has been generated by the mobile device 14 and transmitted to the server 16, the information about the welding wire 14 is retrieved from the server 16. This is shown in FIG. 4, for instance. The information retrieved is labeled as product information wherein the most relevant information can be displayed directly, in particular the code 28 of the welding wire 14 entered.

The information is provided to the user of the mobile device 12 since the information is displayed on the display 22 of the mobile device 12. The information may be downloaded directly on the mobile device 12 such that the information is still available at a later time. Alternatively, the mobile device 12 has only direct (web) access to the server 16 such that the information stored on the server 16 is just displayed on the display 22 of the mobile device 12.

In FIG. 5, it is shown that the user may select certain different documents which he wants to retrieve, for instance a wire chemical analysis, a product data sheet, a safety data sheet and a TÜV approval certificate. These documents are selected by the user as shown in FIG. 5.

Then, the documents selected may be retrieved from the server 16 and provided to the user by displaying this information on the mobile device 12 as shown in FIGS. 6 to 9, in particular sent via e-mail.

Once again, the documents may be just displayed since the application provides access to the information stored on the server 16.

Further, the user may have certain options how to proceed with this information retrieved.

For instance, the user may save, forward and/or share the information retrieved. Moreover, the user may select to send the dedicated document via e-mail from the server 16 to his account or any other person provided that the user has the rights needed.

In general, it is ensured that the user can access the relevant information of the welding wire 14 independently of the business hours of the manufacturer or distributor since the information can be accessed via the internet using the mobile device 12.

The invention claimed is:

1. A method for retrieving private and/or confidential information about an individual welding wire used by a welding machine for qualifying the individual welding wire for use in the welding machine in a welding process, wherein the private and/or confidential information is stored on an off-site server, with the following steps:
 a) Providing the individual welding wire provided with a machine-readable code,
 b) Providing a mobile device having internet access,
 c) Entering said code by using said mobile device,
 d) Retrieving said private and/or confidential information about said individual welding wire from the off-site server based upon said code, wherein said private and/or confidential information comprises at least one document being in the form of a purchase order, a packing list, a transport document, a proof of delivery, a commercial information, a certificate of origin, a quality certificate, an approval certificate, a chemical analysis certificate, a certificate of conformance, a declaration of performance and/or a safety data sheet, and
 e) Providing said private and/or confidential information retrieved to a qualified inspector for review prior to initiating the welding process, wherein said private and/or confidential information is provided with rest requirements limiting access to said private and/or confidential information.

2. The method according to claim 1, wherein said code is entered by the qualified inspector manually.

3. The method according to claim 1, wherein said code is scanned with said mobile device.

4. The method according to claim 1, wherein said private and/or confidential information retrieved is displayed on said mobile device, or said private and/or confidential information retrieved is stored on said server, said information retrieved being downloaded from said server, in particular said server being a cloud server, said at least one document comprised in said private and/or confidential information being unamendable.

5. The method according to claim 1, wherein said information retrieved is only displayed on said mobile device, or said privacy and/or confidential information retrieved is stored on said off-site server, and said private and/or confidential information retrieved being only downloaded from said off-site server.

6. The method according to claim 1, wherein said mobile device is a smart phone or a tablet computer.

7. The method according to claim 1, wherein said private and/or confidential information is printed and/or sent to the qualified inspector, in particular wherein said private and/or confidential information is sent via e-mail.

8. The method according to claim 1, wherein said code is provided by a coded individual welding wire and/or by a code printed on a drum of said individual welding wire, printed on a spool of said individual welding wire, printed on a tag attached to said individual welding wire and/or printed on a packaging of said individual welding wire.

9. The method according to claim 1, wherein said code is a linear code, a 2D code, and/or a radio frequency code, in particular a bar code and/or a QR code.

10. The method according to claim 1, wherein the qualified inspector can select said private and/or confidential information to be retrieved manually, in particular at least one document.

11. The method according to claim 1, wherein said mobile device is configured such that said private and/or confidential information retrieved can be saved and/or distributed.

12. The method according to claim 1, wherein said code is scanned with said mobile device and wherein said private and/or confidential information retrieved is reviewed for compliance with a qualification process.

13. A computer-implemented method for retrieving private and/or confidential information about an individual welding wire used by a welding machine for qualifying the individual welding wire for use in the welding machine in a welding process, wherein the private and/or confidential information is stored on an off-site server data related to a machine-readable code of said individual welding wire being generated by a mobile device having internet access based upon said code of said individual welding wire, said data generated being processed by said mobile device such that private and/or confidential information about said individual welding wire is inquired and provided to said mobile device, wherein said private and/or confidential information comprises at least one document being in the form of a purchase order, a packing list, a transport document, a proof of delivery, a commercial information, a certificate of origin, a quality certificate, an approval certificate, a chemical analysis certificate, a certificate of conformance, a declaration of performance, and/o a safety data sheet, which private and/or confidential information is passed to a qualified inspector for review prior to initiating the welding process, wherein said private and/or confidential information is provided with restriction requirements limiting access to said private and/or confidential information.

14. The computer-implemented method according to claim 13, wherein said data are generated by scanning or manually entering said code of said individual welding wire.

15. The computer-implemented method according to claim 13, wherein said private and/or confidential information retrieved is displayed on said mobile device, or said private and/or confidential information retrieved is stored on said server, said information retrieved being downloaded from said server, in particular said server being a cloud server, said at least one document comprised in said private and/or confidential information being unamendable.

16. The computer-implemented method according to claim 13, wherein said private and/or confidential information retrieved is only displayed on said mobile device, or said private and/or confidential information retrieved is stored on said server, said private and/or confidential information retrieved being only downloaded from said server.

17. A system for retrieving private and/or confidential information about an individual welding wire used by a welding machine for qualifying the welding wire for use in the welding machine in a welding process, wherein the private and/or confidential information is stored on an off-site serve comprising an individual welding wire with a machine-readable code and a mobile device that is configured to process said code in order to retrieve private and/or confidential information about said individual welding wire, wherein said private and/or confidential information comprises at least one document being in the form of a purchase order, a packing list, a transport document, a proof of delivery, a commercial information, a certificate of origin, a quality certificate, an approval certificate, a chemical analysis certificate, a certificate of conformance, a declaration of performance, and/or a safety data sheet, wherein said private and/or confidential information is passed to a qualified inspector for review prior to initiating the welding process wherein said private and/or confidential information is provided with restriction requirements limiting access to said private and/or confidential information.

18. A system according to claim 17, wherein said mobile device comprises a processing unit that is configured to run an application, said processing unit being further configured to perform a computer-implemented method of:
a) Providing an individual welding wire having a code,
b) Providing a mobile device having internet access,
c) Entering said code by using said mobile device,
d) Retrieving private and/or confidential information about said individual welding wire from a server based upon said code, and
e) Providing said private and/or confidential information retrieved to the qualified inspector,
wherein the qualified inspector can select said private and/or confidential information be retrieved manually.

19. The system according to claim 17, wherein said system is configured to perform the following steps:
a) Providing an individual welding wire having a code,
b) Providing a mobile device having internet access,
c) Entering said code by using said mobile device,
d) Retrieving private and/or confidential information about said individual welding wire from a server based upon said code, and
e) Providing said private and/or confidential information retrieved to the qualified inspector, wherein said private and/or confidential information is provided with restriction requirement limiting access to said private ad/or confidential information.

20. The system according to claim 17, wherein said private and/or confidential information retrieved is displayed on said mobile device, or said private and/or confidential information retrieved is stored on said server, said private and/or confidential information retrieved being downloaded from said server, in particular said server being a cloud server, said at least one document comprised in said information private and/or confidential being unamendable.

21. The system according to claim 17, wherein said private and/or confidential information retrieved is only displayed on said mobile device, or said private and/or confidential information retrieved is stored on said server, said private and/or confidential information retrieved being oily downloaded from said server.

* * * * *